United States Patent [19]
Drost et al.

[11] Patent Number: 6,028,903
[45] Date of Patent: Feb. 22, 2000

[54] DELAY LOCK LOOP WITH TRANSITION RECYCLING FOR CLOCK RECOVERY OF NRZ RUN-LENGTH ENCODED SERIAL DATA SIGNALS

[75] Inventors: Robert J. Drost, Palo Alto; Robert J. Bosnyak, San Jose, both of Calif.

[73] Assignee: Sun Microsystems, Inc., Palo Alto, Calif.

[21] Appl. No.: 08/832,623

[22] Filed: Mar. 31, 1997

[51] Int. Cl.[7] ........................................... H04L 7/02
[52] U.S. Cl. ............................... 375/360; 375/375
[58] Field of Search .................... 375/359, 360, 375/361, 371, 373, 376, 375; 327/161, 153, 162

[56] References Cited

U.S. PATENT DOCUMENTS

| | | | |
|---|---|---|---|
| 3,790,892 | 2/1974 | Tan et al. | |
| 4,513,427 | 4/1985 | Borriello et al. | 375/360 |
| 5,436,938 | 7/1995 | Pigeon | 375/376 |
| 5,661,419 | 8/1997 | Bhagwan | 327/157 |
| 5,771,264 | 6/1998 | Lane | 375/376 |
| 5,875,219 | 2/1999 | Kim | 375/376 |

FOREIGN PATENT DOCUMENTS

| | | |
|---|---|---|
| 0655840A2 | 2/1974 | European Pat. Off. . |
| 0081750A1 | 6/1983 | European Pat. Off. . |
| 0487902A2 | 6/1992 | European Pat. Off. . |
| 2504154 | 8/1976 | Germany . |

OTHER PUBLICATIONS

"Fiber Optic Minimun Component Count Clock Recovery Scheme", IBM Technical Disclosure Bulletin, vol. 31, No. 2, Jul. 1988, New York, pp. 169–170.

Beomsup Kim et al., "PLL/DLL System Noise Analysis for Low Jitter Clock Synthesizer Design", Proc. of the Intl. Symposium on Circuits and Systems, Jun. 1994.

Inyeol Lee et al., "A 622Mb/s CMOS Clock Recovery PLL with Time–Interleaverd Phase Detector Array", IEEE ISSCC Digest, pp. 198–199, 1996.

B. Razavi, Monolithic Phase–Locked Loops and Clock Recovery Circuits, IEEE Press, pp. 16–17, 1996.

*Primary Examiner*—Tesfaldet Bocure
*Attorney, Agent, or Firm*—McDermott, Will & Emery

[57] ABSTRACT

A clock recovery circuit uses a pair of variable delay lines to recover clock from a non-return to zero (NRZ) data stream. If an incoming clock transition occurs in the NRZ data, it is passed through one delay line to the output. If no incoming transition occurs, the transition at the output of the first delay line is recycled back through the second delay line. The outputs of the first and second delay lines are combined so that a transition occurs at every possible transition instant, regardless of whether a transition is present in the incoming data at the corresponding time. This permits the benefits of a delay locked loop to be achieved when using NRZ data. Applications of the clock recovery circuits to gigabit data communications systems are describe.

12 Claims, 11 Drawing Sheets

DELAY LOCK LOOP WITH TRANSITION RECYCLING FOR CLOCK RECOVERY OF NRZ RUN-LENGTH ENCODED SERIAL DATA SIGNALS

FIELD OF THE INVENTION

The invention relates to clock recovery circuits and, more particularly, to improvements in a delay lock loop to permit it to be utilized for clock recovery of non-return to zero data.

BACKGROUND OF THE INVENTION

In the prior art, clock is recovered from incoming data under circumstances where a parallel clock cable is not economical or where clock skew makes a separate clock line unfeasible.

Phase locked loops, frequency locked loops and phase and frequency locked loops are known in the prior art and have been utilized for clock recovery. An exemplary construction of devices of this type is shown in FIG. 13. Incoming data is compared with the output of a voltage controlled oscillator 1300 in a phase and/or frequency comparator 1310. An error voltage is generated at the output of the comparator 1310 which represents the difference in phase or frequency or both of the two signals. That error voltage then is utilized to control the frequency of the VCO 1300 to bring it into frequency and/or phase-lock with the incoming data stream. The output is a clock signal that is frequency and/or phase locked with the incoming data.

Voltage controlled oscillators used in frequency and phase-lock loops have a problem in that they accumulate jitter. That is, a phase transition is based on a previous transition and therefore, if the previous transition is off, the next one will be, too. Further, if each transition is off slightly because of jitter, since the transition is based on a previous transition, the phase error will accumulate.

VCO's also have the problem that a certain amount of time is required for them to adjust to changes in the input signal. The speed with which a VCO tracks changes in the incoming signal is a function of bandwidth. At very high bandwidths, the rate of change will be very fast, whereas at lower bandwidths, the change will be much slower. Typically, high bandwidths are difficult to achieve in VCO's.

Further, VCO's are subject to frequency change as a result of variations in supply voltages. When the supply voltage changes, the frequency of the VCO changes until the feedback loop compensates.

Delay lock loops are also known in the prior art. An exemplary delay lock loop is shown in FIG. 14. Incoming data is routed to a voltage control delay line 1400. The output of the voltage controlled delay line 1500 is returned to one input of a phase comparator 1410. The other input of the phase comparator 1410 receives an incoming data stream. The phases of the two data streams are compared in the comparator and an error voltage is generated and applied to a low pass filter 1420, the output of which is utilized to control the amount of delay to be inserted by the voltage control delay line 1400.

Delay lock loops have two important advantages over phase-lock loops. First, because the delay line has no "memory," its transfer function is a constant, thereby yielding a first-order open-loop transfer function for the entire system (for a first-order LPF). Consequently, delay lock loops have much more relaxed tradeoffs among gain, bandwidth and stability. Second, delay lines typically introduce much less jitter than oscillators. Intuitively, this is because delaying a signal entails much less uncertainty than generating it. From another point of view, noise injected into a delay lock loop disappears at the end of the delay line, whereas it is recirculated when a voltage controlled oscillator is used.

Voltage control delay lines of a type used in a delay locked loop are also known. An exemplary delay line is shown in FIG. 15. A voltage control delay line consists of a plurality of delay elements 15-1–15-N. The number of delay elements effectively inserted into the signal path between $V_{in}$ and $V_{out}$ is a function of the control input voltage. As the input voltage changes, the number of delay elements effectively inserted in the path increases or decreases.

The Problems

A delay lock loop can not be used to recover a clock from a data signal which does not have a transition at each clock instant (typically each ½ cycle of clock frequency), since prior art delay lock loops depend on the input signal to provide the input clock for the delay line. A similar problem exists with frequency lock loops since missing transitions are indistinguishable from a change in frequency.

Thus, while delay lock loops have superior properties over prior art phase lock loop frequency constructions, they can not be utilized with certain types of non-return to zero encoding which do not have a transition at each possible clock instant such as each clock half cycle.

Clock recovery in a serial data communication system is a critical function which is necessary in order to decode the underlying time multiplexed divisions between symbols of data being communicated. A method which is commonly used in order to recover a clock from a data pattern is to use some form of a phase lock loop (PLL) or frequency lock loop (FLL). However, these have the problems described above.

As noted above, current DLL's can not be used to recover a clock from a data signal which does not have transitions at each clock instant since current delay lock loops depend on the input signal to provide the input clock for the delay line.

SUMMARY OF THE INVENTION

The invention is directed to a clock recovery system which overcomes the problems of the prior art and which has the beneficial properties of a delay lock loop, yet can lock to an input data pattern which does not have a transition at each clock instant (possible data transition instant). Preferably, the data pattern consists of a non-return to zero encoding of the data and some additional encoding to ensure a maximum run-length (e.g., 8B10B).

The invention is also directed to a gigabit ethernet system using non-return to zero encoding in which expensive clocks needed for clock recovery in the prior art can be replaced with less accurate inexpensive clocks.

The invention relates to a circuit for clock recovery, including a data input, a first XOR gate and a second XOR gate, each having one input connected to the data input, a first delay line and a second delay line, inputs of which are connected to respective outputs of the first XOR gate and the second XOR gate and outputs of which are connected to respective inputs of a third XOR gate, the output of the third XOR gate being connected to a second input of the second XOR gate and providing a recovered clock.

The invention is also directed to a method of recovering a clock signal from NRZ encoded data by, when incoming data contains a transition at a clock instant, passing that transition to an output, and when incoming data does not contain a transition at a clock instant, recycling a previous transition from the output, whereby the output has a transition at every clock instant.

The invention is also directed to a method of controlling the delay of a delay line in a clock recovery circuit by comparing the phase of transitions contained in an incoming data stream with the phase of transitions in a recovered clock, and adjusting the amount of delay of the delay line to cause the transitions of the recovered clock to coincide with transitions contained in the incoming data stream based on the phase comparison.

The invention is also directed to a method of controlling the delay of a delay line in a clock recovery circuit by comparing the phase of transitions contained in a recovered clock with the phase of transitions in a clock generated using a variable delay line, adjusting the variable delay line to cause the transitions of the recovered clock to coincide with the transitions of the clock generated using the variable delay line, and adjusting the amount of delay of the delay line in a clock recovery circuit by substantially the same amount. As the amount by which the variable delay line was adjusted.

The invention also relates to a communications system, having a first station and a second station, each station having a transmitter controlled by a local clock and a receiver receiving data from an other station, a clock recovery circuit recovering clock from data received at a receiver and comparing it with the local clock to derive a control signals for controlling the amount of delay imparted to incoming data so that the transitions of incoming data are synchronized with transitions of the local clock.

The invention also relates to a method of operating a communication system, by recovering clock from incoming data, comparing recovered clock with a locally generated clock, and adjusting a delay line so that transitions from the incoming data coincide with transitions from the local clock.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
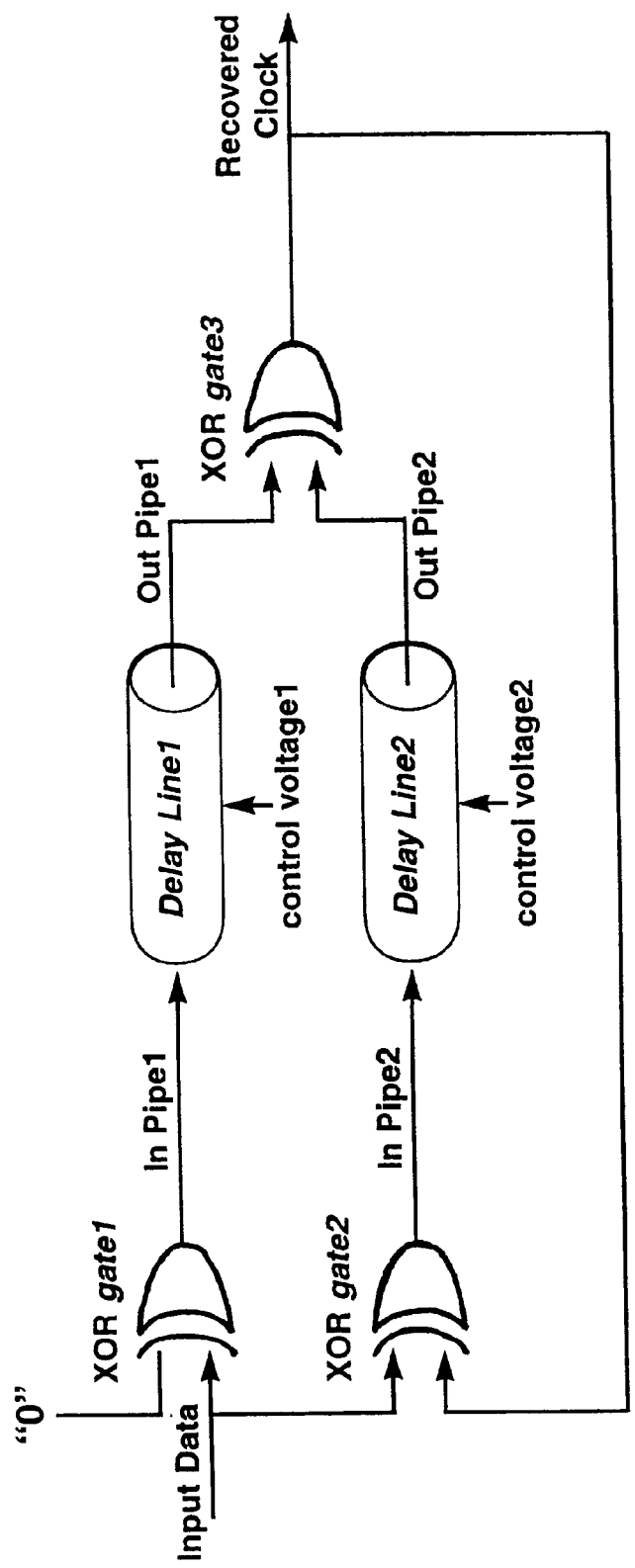
FIG. 1 is a schematic representation of a delay lock loop circuit in accordance with the invention which operates with non-return to zero encoding which does not have a transition at every possible transition instant (clock instant).

FIG. 1 is a schematic representation of a delay lock loop circuit in accordance with the invention which operates with non return to zero encoding which does not have a transition at every possible transition instant. Such incoming data is applied to one input of XOR gate1. The other input of XOR gate1 is held constant at a logic "0" condition. The input data passes through XOR gate1 to In Pipe1 input to Delay Line1. The amount of delay interposed by Delay Line1 between In Pipe1 and Out Pipe1 is a function of the applied control voltage1. Signal data passing through Delay Line1 is applied to one input of XOR gate3. The other input of XOR gate3 comes from Delay Line2. If Out Pipe2 were not changing, the signal from Delay Line1 would pass through XOR gate3 unimpeded and become part of the recovered clock signal. That recovered clock signal forms one input to XOR gate2. The other input to XOR gate2 is the input data. The input data and the recovered clock are combined logically in XOR gate2 and applied to Delay Line2, the delay of which is set by control voltage2. In practice, if the characteristics of Delay Line1 and Delay Line2 are sufficiently matched, a single control voltage can be applied to each. That would be the normal case. As long as transitions are occurring at every instant, the path through Delay Line1 would be followed and form part of the recovered clock. However, when transitions do not occur in the input data, a path will be followed through Delay Line2 which recirculates the previous transition from the recovered clock through Delay Line2 for insertion in the recovered clock signal. Thus, the recovered clock signal comprises transitions of input data, when such transitions exist, and of recirculated transitions through the Delay Line2 path when input data transitions do not exist.

The loop acts as follows when the system is already in lock:

1. The Recovered Clock signal transitions at a time at which the Input Data signal may have transitioned.
2. If the Input Data signal did in fact transition, a transition occurs on signal In Pipe1, if not, a transition occurs on signal In Pipe2. Either XOR introduces a delay, Td(XOR gate1 or XOR gate2).
3. The transition on either In Pipe1 or In Pipe2 then propagates through either of the respective delay lines Delay Line1 or Delay Line2 and appears on either the Out Pipe1 or Out Pipe2 signal, respectively, after delay Td(Delay Line1 or Delay Line2).
4. Finally, XOR gate3 takes the one transition on either In Pipe1 or In Pipe2 and produces a transition on the Recovered Clock signal adding a delay of Td(XOR gate3).
5. At this point, the cycle repeats: the Recovered Clock signal has transitioned as in step 1, at a time at which the Input Data signal may have transitioned.

Obviously, a critical requirement for the statement at step 5 to be true is that the loop delay, the sum of the three delays Td(XOR gate1 or XOR gate2)+Td(Delay Line1 or Delay Line2)+Td(XOR gate3), be about equal to the bit interval, the time interval between possible Input Data signal transitions.

Note that this equality between the loop delay and the bit interval does not need to be perfect if the data pattern on the Input Data signal has some maximum run length (the maximum number of successive bit intervals which have the same value, and which thus produce a waveform without transitions). For instance with a maximum run length of five, if one assumes that the delay inequality is 1000 ppm (i.e. 0.1%), then in five bit intervals, assuming a 1 ns bit interval, the Recovered Clock signal's transition will have only moved 5.0 picoseconds ahead or behind the Input Data signal's transition. This magnitude of an error is completely acceptable in most systems.

Figure 2:
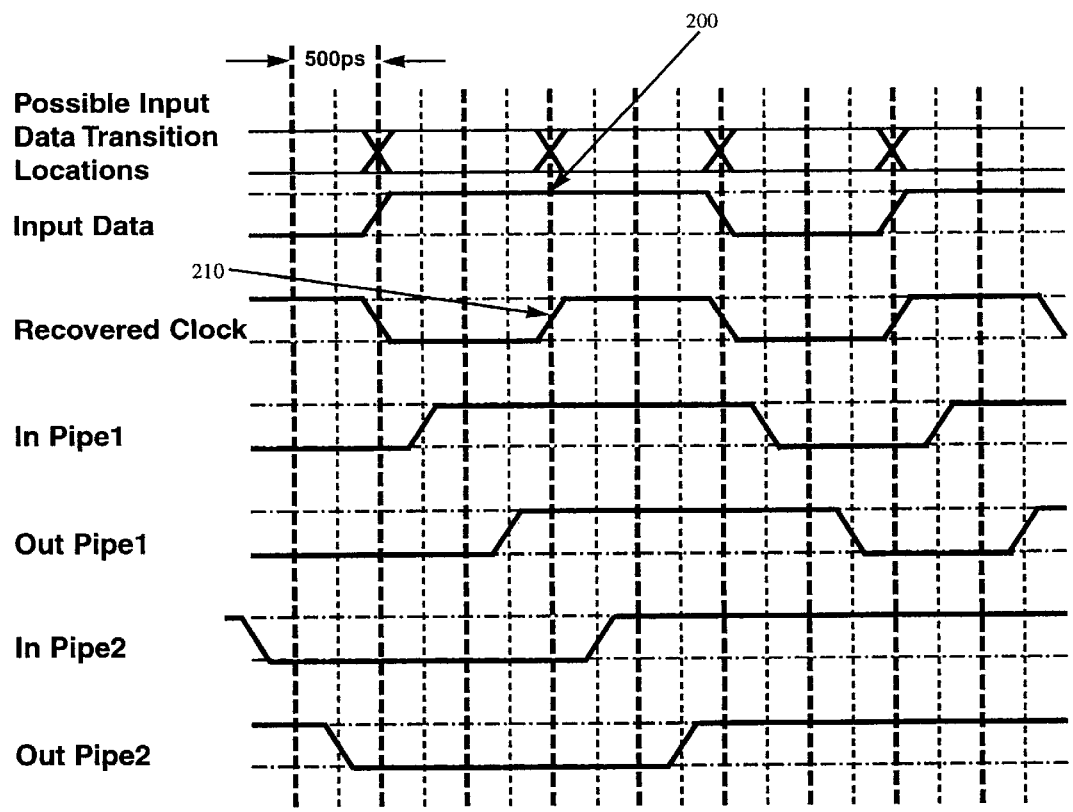
FIG. 2 is a signal diagram illustrating the relationships of signals occurring during operation of the circuit of FIG. 1.

FIG. 2 is a signal diagram illustrating the relationship of signals occurring during operation of the circuit of FIG. 1. For purposes of the diagram shown in FIG. 2, the XOR gates are assumed to present a delay of 250 picoseconds and the delay lines present a delay of up to 500 picoseconds and the bit interval is a thousand picoseconds. The voltage levels shown at the various signal points identified in FIG. 1 are reflected in this timing diagram. One should note that the input data does not have a transition at possible transition point 200 whereas the recovered clock does have such a transition (210). Thus, the circuit in FIG. 1 imposes a transition where no transition existed in the incoming data by recirculating a transition from the recovered clock through Delay Line2.

Figure 3:
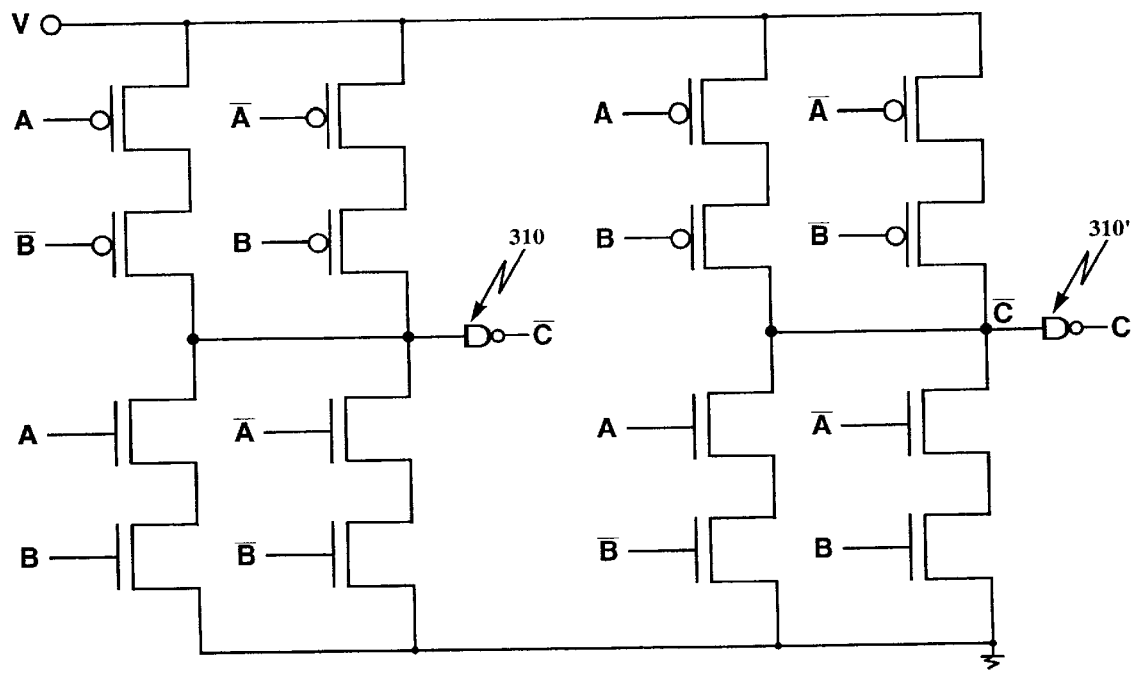
FIG. 3 is a schematic diagram of an XOR gate implementation suitable for use with the circuit of FIG. 1.

FIG. 3 is a schematic diagram of an XOR gate implementation suitable for use for the circuit of FIG. 1. In a preferred embodiment, this XOR gate is implemented in 0.6 micron CMOS technology. The individual gates have switching times between 100 and 250 picoseconds and the use of inverters 310 and 310' is optional, although, the use of inverters can enhance certain effects to be discussed hereinafter. The implementation shown in FIG. 3 assumes that double rail logic is utilized, providing both regular (C) and inverted ($\overline{C}$) versions of the output signal.

The system shown in FIG. 1 does not require that the delay around the loop be equal to the data bit interval time. What this implies is that the Recovered Clock signal can drift and acquire a phase error in comparison to the Input Data signal over successive intervals during which the Input Data signal has no transition. This condition is corrected when the Input Data signal finally has a transition.

Figure 4:
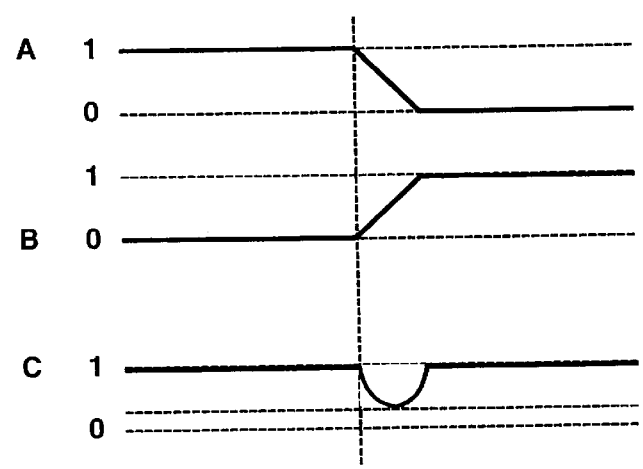
FIG. 4 is a signal diagram illustrating the glitch suppression properties of the XOR gate of FIG. 3.

A delay property of the XOR gate which is very significant in this case is how the gate responds to "glitch" conditions. Consider the case in which the XOR gate simultaneously sees one input go from 0→1 while the other input goes from 1→0 as shown in FIG. 4. Depending on how the XOR gate was designed, one could either see the XOR gate's output stay at 1, or see a momentary "glitch" of the output dropping to 0. An XOR gate designed in the typical fashion will not exhibit this "glitch." In fact, a typical XOR gate will have some margin in the time separation between the two inputs transitioning for which no glitch will be output. For example, in a 0.6 um CMOS technology using stacked transistor XOR gate, the separation can often be as large as 100 ps.

Now, if the Recovered Clock signal has drifted to become, for instance, 50 ps ahead or behind the Input Data signal, then when a transition occurs, it will be possible for XOR gate2 to suppress the momentary "glitch" and hold its output without producing a transition. Even if it does produce a short glitch, it is still likely that Delay Line2 will destroy the glitch.

Thus, some amount of error in the delay around the loop can be tolerated as long as the glitch suppression property is effective at eliminating it. In addition with this desired property in mind, it is possible to design the XOR gate to have a large glitch suppression window.

This property of glitch suppression is used to remove any accumulated error in the Recovered Clock signal's phase and reset it to the phase of the newest Input Data signal's transition. Thus like a delay lock loop, the system has no "memory" and has the equivalent of an unlimited continuous time bandwidth in transferring jitter on the Input Data signal to the Recovered Clock signal (this is generally true for a sampled system when it completely responds in one sample interval to a property of an input signal).

Figure 5:
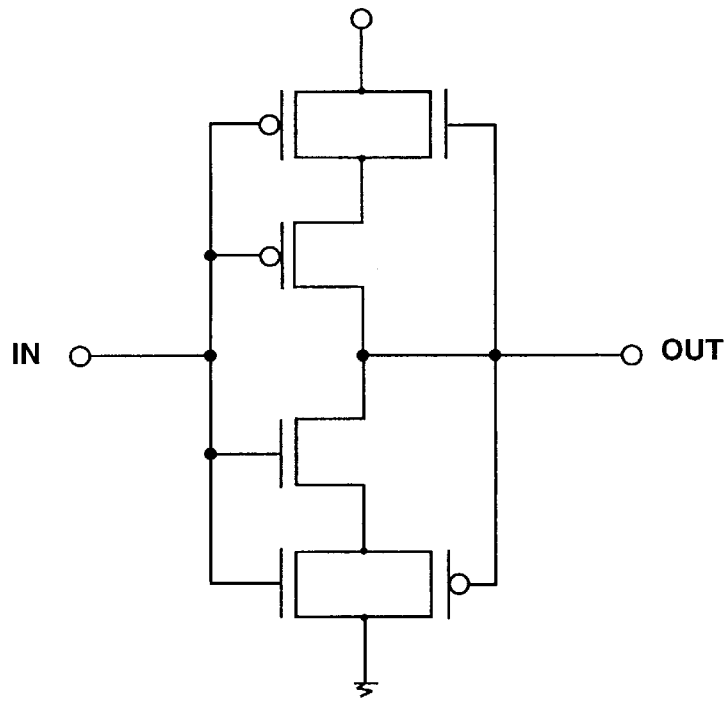
FIG. 5 is a schematic diagram of a Schmitt trigger inverter circuit for enhancing the glitch suppression properties of the circuit of FIG. 3.
Figure 6:
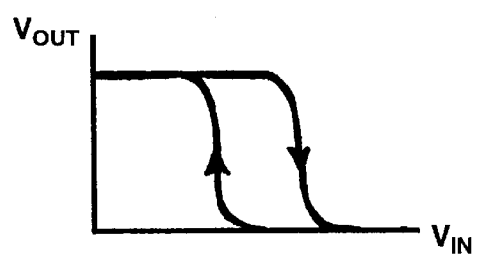
FIG. 6 illustrates two switching thresholds of the Schmitt trigger of FIG. 5.

FIG. 5 is a schematic diagram of a Schmitt trigger inverter circuit for enhancing the glitch suppression properties of the circuit of FIG. 3. As is known in the prior art, a Schmitt trigger has two different switching thresholds. One must be exceeded for the device to switch in one direction and a different threshold must be exceeded for the device to switch in the opposite direction. This is illustrated in FIG. 6. If the inverter circuits 310 and 310' are implemented using the Schmitt trigger circuit of FIG. 5, the hysteresis effect illustrated in FIG. 6 will enhance the glitch suppression properties of the XOR gate of FIG. 3 in ways which can be controlled and provide a broader range of glitch suppression than the limits of the circuit of FIG. 3 without the inverters 310 and 310' could provide.

Figure 7:
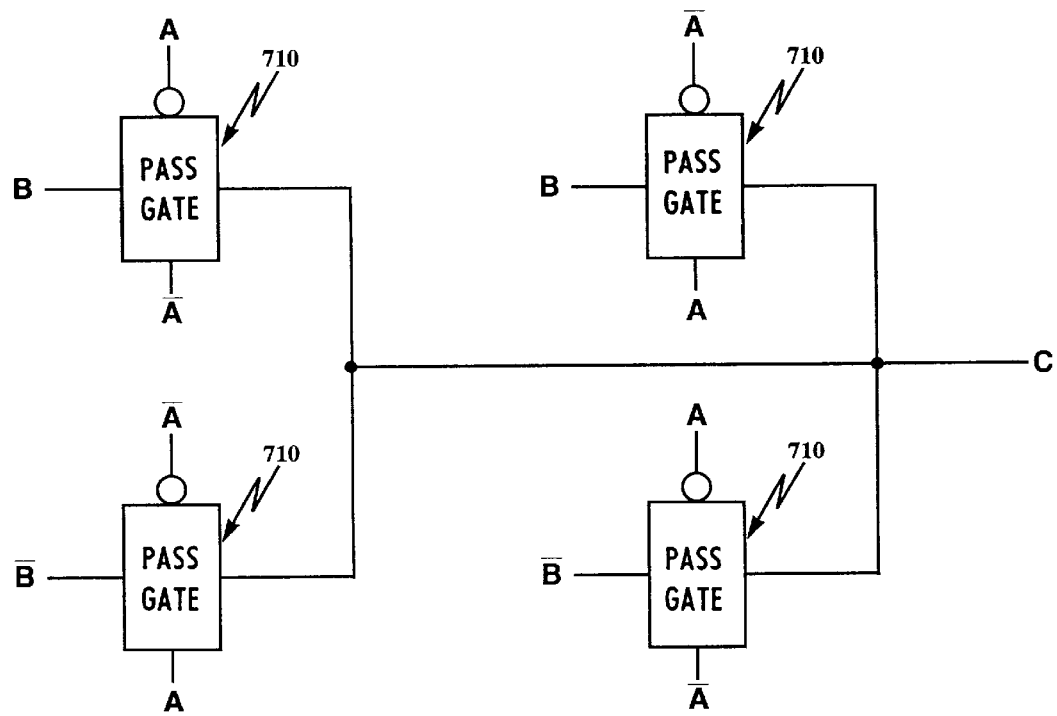
FIG. 7 is a schematic diagram of a second XOR gate implementation using pass gates suitable for use with the circuit of FIG. 1.

FIG. 7 is a schematic diagram of a second XOR gate implementation using pass gates suitable for use with the circuit of FIG. 1. Implementing an XOR gate with pass gates 710 provides the advantage that the gates become slower with decreasing sizes which results in an increased glitch suppression capability for the XOR gate. This can be utilized to control the amount of glitch suppression during the fabrication process.

There are two ways to maintain the loop delay (i.e. Td(XOR gate1 or XOR gate2)+Td(Delay Line1 or Delay Line2)+Td (XOR gate3)) is maintained to be about equal to the bit interval of the input data signal.

Figure 8:
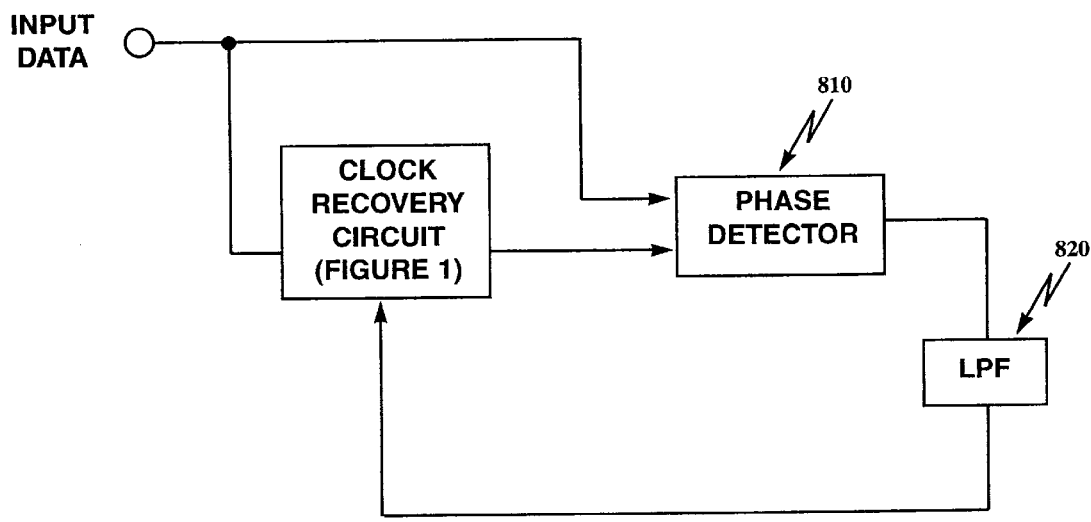
FIG. 8 is a block diagram showing one technique for maintaining the loop delay to be about equal to a bit interval.

FIG. 8 is a block diagram showing one technique for maintaining the loop delay to be about equal to a bit interval. In this approach one can use a phase detector (810) to compare the Input Data signal's transitions to the Recovered Clock signal's transitions. The error signal from the phase detector can be fed into a low pass filter (820) in order to set desired loop bandwidth and stability properties, and the filter's output could be used as the control signal to set a controllable delay element in the system delay lines shown in FIG. 1. With this method the system is most similar to a DLL. A typical DLL compares the phase of a clock being fed into a delay line to the phase of the clock coming out of the delay line, and adjust the delay line to produce an n×2 pi (n is a positive integer) difference in the phases. The additional feature of the FIG. 1 system is that it recycles a past transition in the cases in which the Input Data signal does not provide a new transition.

Figure 9:
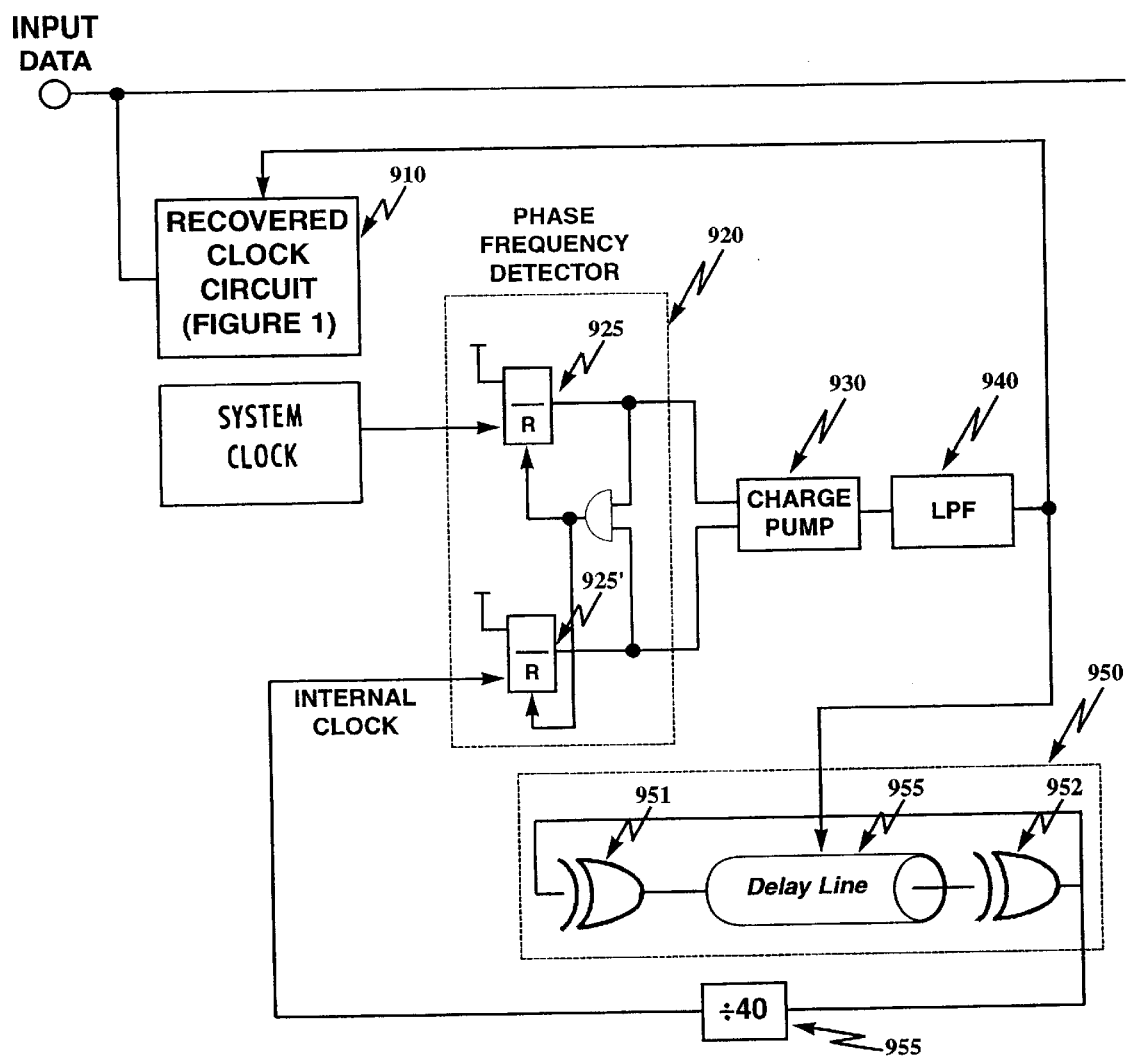
FIG. 9 is a schematic diagram of a second technique for maintaining the loop delay to be about equal to the bit interval of the input data signal.

FIG. 9 is a schematic diagram of a second technique for maintaining the loop delay to be about equal to the bit interval of the input data signal. In this approach, one can set some controllable delay element (e.g. a series gated inverter) in the FIG. 1 circuit of this system using a control signal (output of 940) derived from a separate replicated system. For example, one can use a separate clock signal (system clock—output of 950) known by design to be within some tolerance of a multiple or fraction of the frequency of the Input Data signal and lock a phase lock loop (950, 955, 920, 930, and 940) whose voltage controlled oscillator (VCO) 950 consists of the XOR, delay line, and XOR elements in the above system (with replicated loading) to this separate clock signal. Then one can use the control signal from the phase lock loop's VCO, to set the replicated controllable delay element in the above system. In this way the delay around the loop in our system will be about equal to the bit interval of the Input Data signal. Although the loop delay will have a percent error given by the difference between the Input Data signal's frequency and the separate clock's frequency, an inexpensive clock oscillator can be used while still easily achieving a matching better than 1000 ppm. This difference only contributes a negligible degradation in the performance of the system at recovering a clock when the Input Data signal has a maximum run length of 5 or 6 (but even 50 would probably be acceptable when the matching error is 1000 ppm). FIG. 9 is an example of such an implementation.

Considering the operation of FIG. 9 in more detail, the input data is applied to a recovered clock circuit of FIG. 1 (910). A system clock is applied to one input of a combined phase frequency detector 920 comprised of flip flops 925 and 925' and gate 926. The up and down outputs of flip flops 925 and 925', respectively, are applied to charge pump 930 to turn it on and off. A low pass filter 940 then provides a filtered output signal for controlling delay lines. An oscillator 950 is comprised of a voltage control delay line 955 driven by an input OR gate and feeding an output OR gate (951 and 952, respectively). The frequency of oscillation of oscillator 950 is controlled by the amount of delay interposed by delay line 955. The output of oscillator 950 is optionally divided by divider 955 and applied as the internal clock input to flip flop 925' of phase frequency detector 920. The voltage utilized to control the delay line of the oscillator 950 can also be applied to the recovered clock circuit of FIG. 1 (910) and control the delay lines in that circuit in the same manner. Thus, the control signal generated to control oscillator 950 (a parallel system) is also utilized to control the clock recovery delay on a delay lock loop 910.

Figure 10:
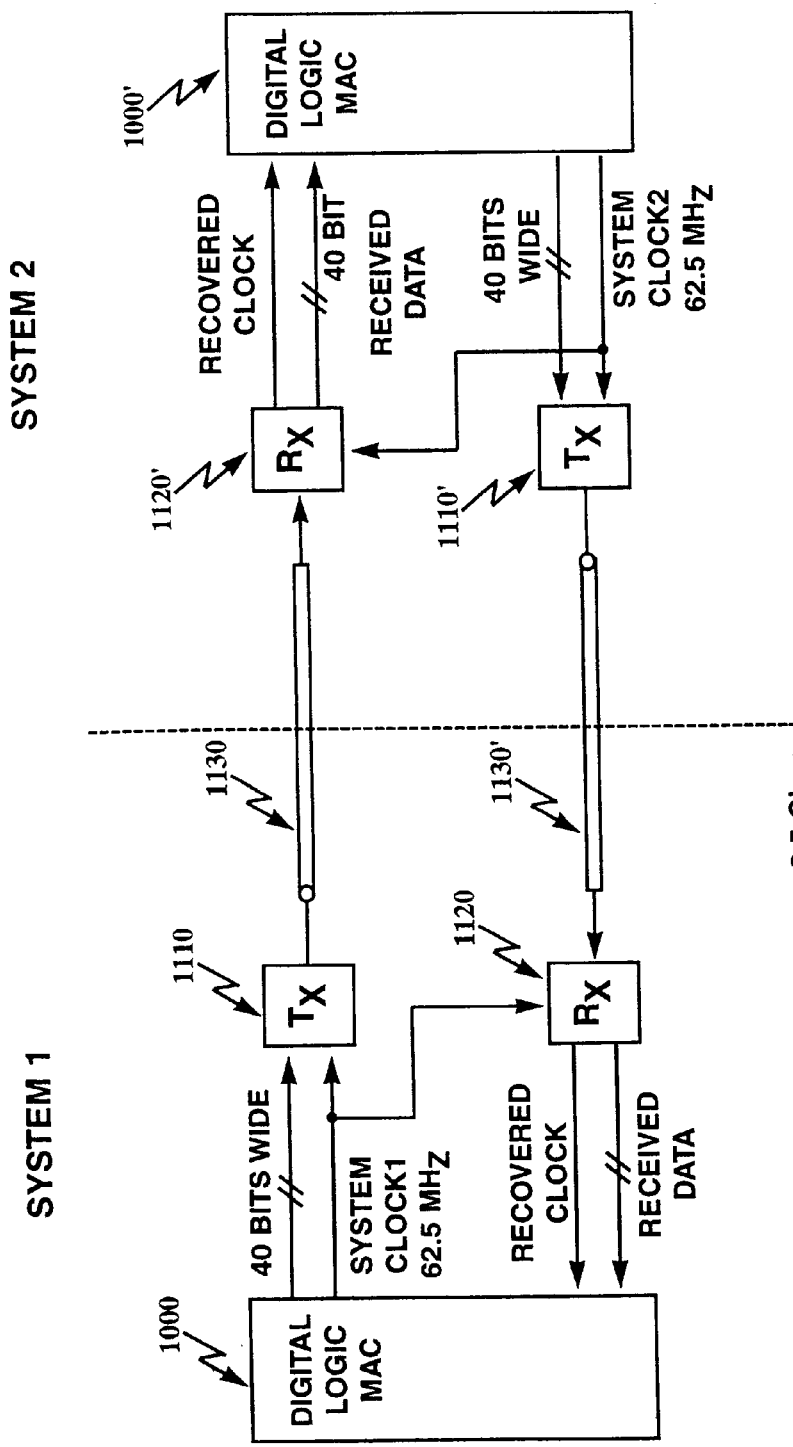
FIG. 10 is an illustration of gigabit communications between two systems in which the invention may be applied for clock recovery.

FIG. 10 is an illustration of gigabit communications between two systems in which the invention may be applied for clock recovery. System 1 provides information for transmission from digital logic media access control (MAC) layer 1000. The data is provided in parallel, 40 bits wide in this example. In addition. system clock 1, running at approximately 62.5 megahertz is provided to the transmitter 1110 for use in generating transmissions over transmission line 1130. Information being received by system 1 from system 2 arrives over transmission line 1130' and is directed to receiver 1120 where the clock is recovered and the data received is provided in parallel to the digital logic MAC layer. System 1 and system 2 are constructed substantially identically and corresponding numbers in system 2 correspond to those of system 1. It is important to note that each system has their own local clock running at approximately 62.5 megahertz. However, these clocks will normally differ in actual frequency and may drift with respect to each other.

Figure 11:
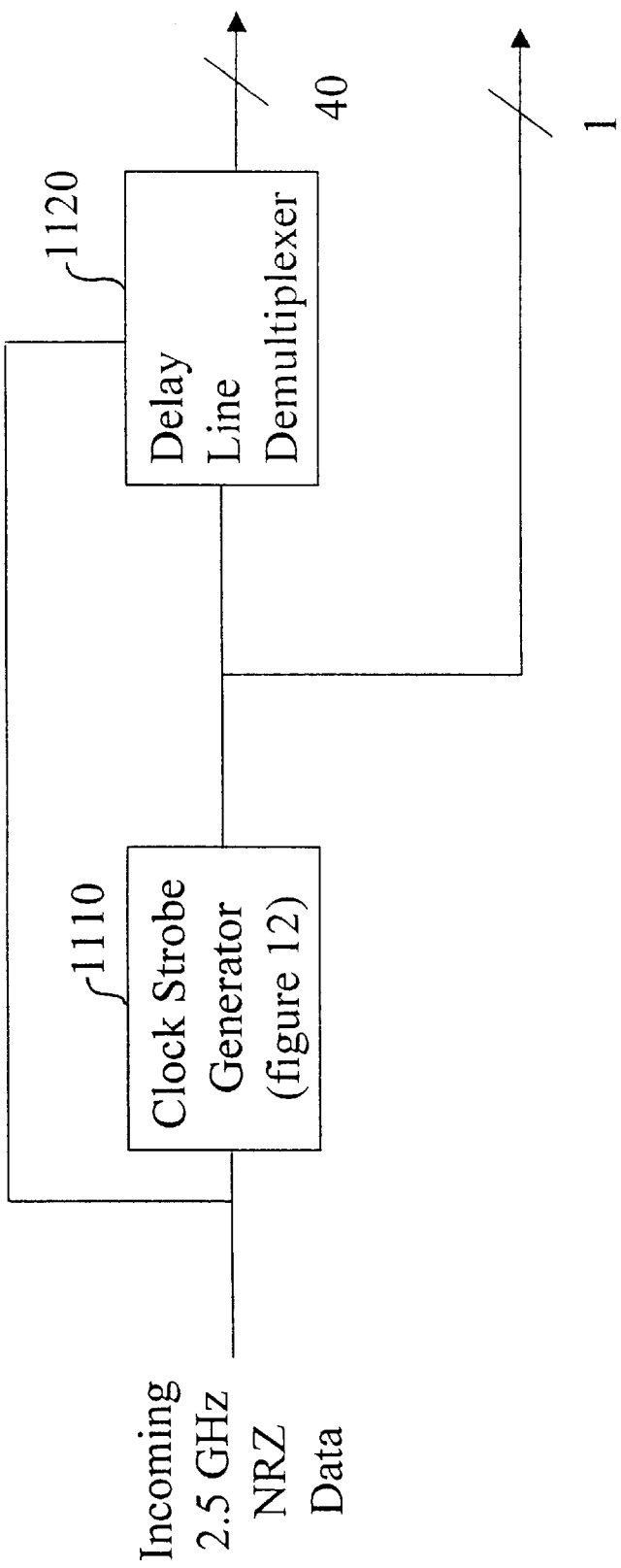
FIG. 11 is a block diagram of a receiver shown in FIG. 10 which locks incoming NRZ gigabit signal data to a local clock.
Figure 12:
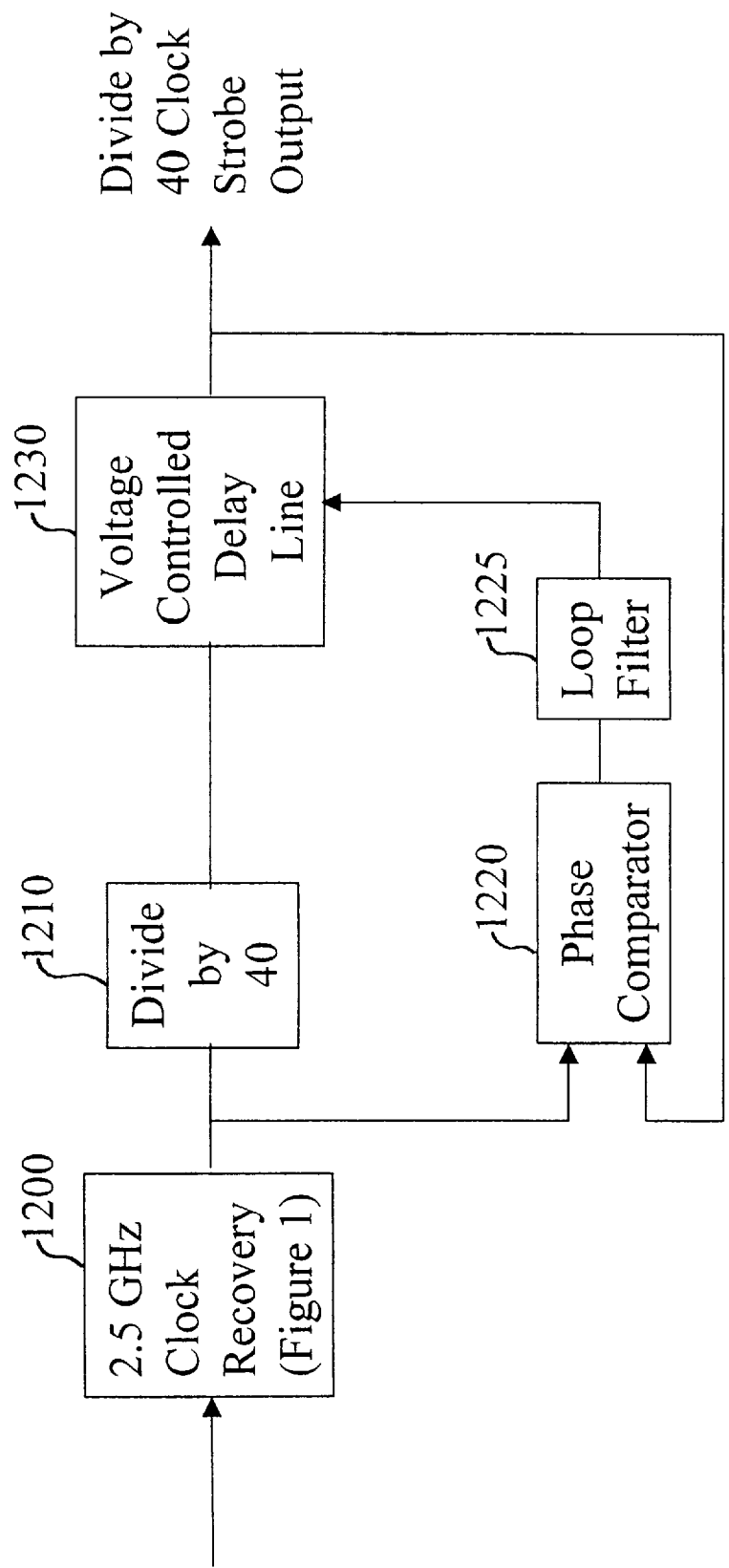
FIG. 12 is a block diagram of one implementation of the synched recovery block of FIG. 11.
Figure 13:
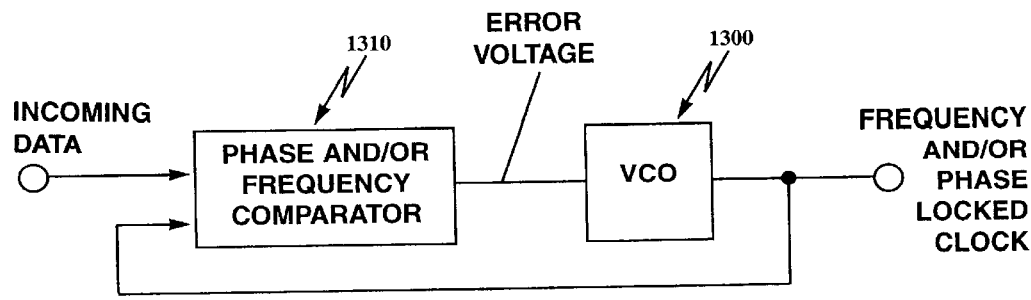
FIG. 13 is a block diagram of a prior art phase/frequency lock loop.
Figure 14:
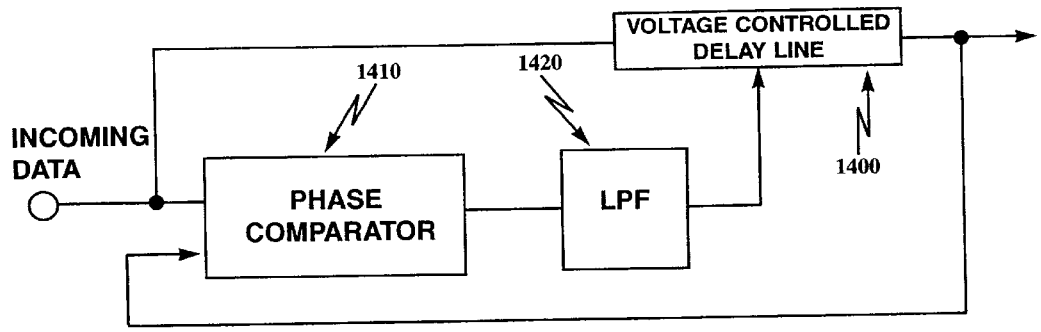
FIG. 14 is a block diagram of a prior art delay locked loop.
Figure 15:
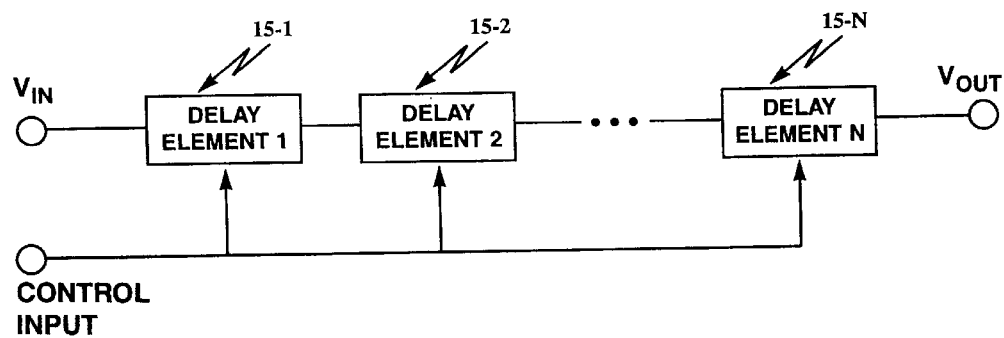
FIG. 15 is a block diagram of a prior art voltage control delay line.

FIG. 11 is a block diagram of a receiver shown in FIG. 10. Incoming 2.5 gigabit per second NRZ data is applied to block 1110 which can be implemented as shown in FIG. 12. The output from block 1110 is a clock strobe which is applied to a delay line demultiplexer 1120 which applies 40 bits in parallel to its output.

FIG. 12 is a block diagram of one implementation of the synchronous recovery block of FIG. 11. In FIG. 12, the 2.5 gigabit per second NRZ data is applied to the input and recovered by clock recovery circuit 1200. This circuit is essentially that shown in FIG. 1. The output frequency of the 2.5 gigahertz clock recovery is divided by 40 (1210) and compared with the output of voltage controlled delay line 1230 in phase comparator 1220. The error output voltage is utilized, typically through a low pass filter 1225, to control voltage control delay line 1230 to ensure that the incoming data is phase locked to the clock strobe output. The output for voltage control delay line 1230 is then provided to the delay line demultiplexer 1120 of FIG. 11.

In this description, when the term "locked" is utilized, it means both that the delay interval around the system's loop is about equal to the bit interval of the input data signal, and that the phase of the recovered clock signal is about equal to the phase of the input data signal. Both conditions are needed. If the bit interval requirement is met but not the phase requirement, then the recovered clock may be far enough out of phase to prevent the glitch suppressing property of the XOR from removing the remaining phase error during the next input data's signal's transition. If the phase requirement is met but not the bit interval, then the phase lock will be only temporary since the recovered clock signal's phase can soon diverge from the input data's signal phase.

There are several advantages to the clock recovery system described herein.

1. Like a delay lock loop, this system has the advantage when compared to a PLL and a FLL that it has no "memory." Whereas PLLs and FLLs recycle and at best slowly remove (while at worst temporarily amplifying) a phase error due to some noise on the inputs or some other sources, this system does not.

2. The effective continuous bandwidth of this system in transferring jitter from the data input to the recovered clock is substantially unlimited.

3. The system can allow for an implementation where the loop delay control signal is derived from a separate clock of a frequency close to the frequency of the input data signal. This is a great advantage since deriving the delay control signal in this way is much easier (the clock is at a low frequency, and is a repetitive signal) and can be done with simpler circuitry in less area and with less power.

There has thus been described a delay lock loop with transition recycling suitable for use in clock recovery of NRZ run length encoded serial data signals in the gigabit frequency range.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A circuit for clock recovery, comprising:
   a. a data input;
   b. a first XOR gate and a second XOR gate, each having one input connected to said data input;
   c. a first delay line and a second delay line, inputs of which are connected to respective outputs of said first XOR gate and said second XOR gate and outputs of which are connected to respective inputs of a third XOR gate, the output of said third XOR gate being connected to a second input of said second XOR gate and providing a recovered clock.

2. The circuit of claim 1 in which said first delay line and said second delay line are voltage controlled delay lines.

3. The circuit of claim 1 in which said data input receives non return to zero data.

4. The circuit of claim 1 in which XOR gates have been fabricated using CMOS technology having a glitch suppression property.

5. The circuit of claim 4 in which XOR gates include a Schmitt trigger connected to an output which enhances the glitch suppression property.

6. The circuit of claim 1 in which XOR gates have been fabricated using pass gate technology, in which the size of pass gates affects an amount of glitch suppression.

7. The circuit of claim 6 in which XOR gates include a Schmitt trigger connected to an output which enhances the glitch suppression property.

8. A method of recovering a clock signal from NRZ encoded data, comprising the steps of:
   a. when incoming data contains a transition at a clock instant, passing that transition to an output, and
   b. when incoming data does not contain a transition at a clock instant, recycling a previous transition from the output, whereby the output has a transition at every clock instant forming a recovered clock.

9. The method of claim 8 comprising the steps of:
   comparing the phase of transitions contained in an incoming data stream with the phase of transitions in said recovered clock; and
   adjusting the amount of delay of said delay line to cause the transitions of the recovered clock to coincide with transitions contained in said incoming data stream based on said phase comparison.

10. The method of claim 8 comprising the steps of:
    comparing the phase of transitions contained in a system clock with the phase of transitions in a clock generated using a variable delay line;
    adjusting the variable delay line to cause the transitions of the clock generated using the variable delay line to coincide with the transitions of the system clock; and
    adjusting the amount of delay of a delay line in a clock recovery circuit by substantially the same amount by which the variable delay line was adjusted.

11. A communications system, comprising:
    a first station comprising a transmitter and a receiver and at least one communications line connecting said first station with a second station, in which said receiver comprises a delay line demultiplexer strobed by a clock strobe generator which operates from a delay line clock recovery circuit with transition recycling of a previous transition.

12. A method of operating a communication system, comprising the steps of:
    a. recovering a clock from incoming data; and
    b. adjusting a delay line so that transitions from the recovered clock coincide with transitions from a divided down version of the recovered clock using transition recycling of a previous transition to generate properly timed clock strobe pulses for a demultiplexer.

* * * * *